United States Patent
Nishihama et al.

(10) Patent No.: US 11,075,570 B2
(45) Date of Patent: Jul. 27, 2021

(54) ROTARY ELECTRIC MACHINE AND DRIVE SYSTEM USING SAME

(71) Applicant: Hitachi Industrial Products, Ltd., Tokyo (JP)

(72) Inventors: Kazuo Nishihama, Tokyo (JP); Masanori Sawahata, Tokyo (JP); Takayuki Koyama, Tokyo (JP); Makoto Imura, Tokyo (JP); Yuuichirou Yoshitake, Tokyo (JP); Kenichi Sugimoto, Tokyo (JP); Kengo Ueda, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 345 days.

(21) Appl. No.: 16/096,552

(22) PCT Filed: Jul. 31, 2017

(86) PCT No.: PCT/JP2017/027585
§ 371 (c)(1),
(2) Date: Oct. 25, 2018

(87) PCT Pub. No.: WO2018/047514
PCT Pub. Date: Mar. 15, 2018

(65) Prior Publication Data
US 2019/0140530 A1     May 9, 2019

(30) Foreign Application Priority Data
Sep. 6, 2016   (JP) .............................. JP2016-173440

(51) Int. Cl.
*H02K 17/16*    (2006.01)
*H02K 17/20*    (2006.01)
(Continued)

(52) U.S. Cl.
CPC ............. *H02K 17/165* (2013.01); *H02K 1/26* (2013.01); *H02K 1/265* (2013.01); *H02K 1/32* (2013.01);
(Continued)

(58) Field of Classification Search
CPC ...... H02K 17/16; H02K 17/165; H02K 17/02; H02K 17/20; H02K 1/26; H02K 1/265;
(Continued)

(56) References Cited

U.S. PATENT DOCUMENTS 3,778,652 A * 12/1973 Endress ............... H02K 17/165
                                                     310/211
5,565,752 A * 10/1996 Jansen ................. H02K 17/165
                                                     310/169
(Continued)

FOREIGN PATENT DOCUMENTS

JP        57-28556 A       2/1982
JP        58-207848 A     12/1983
(Continued)

OTHER PUBLICATIONS

International Search Report (PCT/ISA/210) issued in PCT Application No. PCT/JP2017/027585 dated Oct. 31, 2017 with English translation (four (4) pages).
(Continued)

*Primary Examiner* — Edgardo San Martin
(74) *Attorney, Agent, or Firm* — Crowell & Moring LLP

(57) ABSTRACT

There is provided a rotary electric machine that ensures improving a maximum torque and a rated power factor while reducing an increase in a starting current. In view of this, the rotary electric machine includes a shaft, a rotor, and a stator. The rotor is fixed to an outer periphery of the shaft. The stator is located so as to surround an outer periphery of the rotor. The rotor includes a rotor iron core including a
(Continued)

plurality of rotor slots located at predetermined intervals in a circumferential direction and rotor bars inserted into the rotor slots. Rotor slits communicate with outer peripheral sides of the rotor slots. The rotor slits have a width ws in a circumferential direction. The width ws is smaller than a height hs in a radial direction of the rotor slit, and when a rated current is denoted as I1, a turn ratio (primary/secondary) is denoted as Tr, and a magnetic permeability in a vacuum is denoted as $\mu_0$, a relationship of $ws > \mu_0 \times I1 \times Tr/0.6$ is met.

10 Claims, 7 Drawing Sheets

(51) Int. Cl.
  *H02K 1/26* (2006.01)
  *H02P 25/02* (2016.01)
  *H02K 1/32* (2006.01)
(52) U.S. Cl.
  CPC ............ *H02K 17/16* (2013.01); *H02K 17/20* (2013.01); *H02P 25/02* (2013.01); *H02K 2213/03* (2013.01)
(58) Field of Classification Search
  CPC .. H02K 1/32; H02K 2213/03; H02K 2213/00; H02P 25/02
  See application file for complete search history.

(56) References Cited

U.S. PATENT DOCUMENTS

| | | | |
|---|---|---|---|
| 5,585,709 A | 12/1996 | Jansen et al. | |
| 5,793,178 A * | 8/1998 | Biais | H02P 6/085 318/700 |
| 6,058,596 A * | 5/2000 | Jansen | B21D 28/22 310/211 |
| 6,882,078 B2 * | 4/2005 | Nishihama | H02K 17/165 310/211 |
| 7,851,961 B2 * | 12/2010 | Lang | H02K 17/205 310/211 |
| 8,692,435 B2 * | 4/2014 | Sawahata | H02K 17/165 310/211 |
| 9,729,034 B2 * | 8/2017 | Jung | H02K 1/265 |
| 2014/0252910 A1 * | 9/2014 | Kunihiro | H02K 17/165 310/211 |

FOREIGN PATENT DOCUMENTS

| | | | |
|---|---|---|---|
| JP | 04281347 A | * | 10/1992 |
| JP | 07284254 A | * | 10/1995 |
| JP | 07288958 A | * | 10/1995 |
| JP | 9-507376 A | | 7/1997 |
| JP | 2008278642 A | * | 11/2008 |
| JP | 2011087373 A | * | 4/2011 |

OTHER PUBLICATIONS

Japanese-language Written Opinion (PCT/ISA/237) issued in PCT Application No. PCT/JP2017/027585 dated Oct. 31, 2017 (three (3) pages).

* cited by examiner

FIG. 4

| ws | Ps | Ish | Tmax | p.f. |
|---|---|---|---|---|
| 1.5 | 10.0 | 99 | 56 | 91.5 |
| 1.5 | 6.0 | 115 | 91 | 100.0 |
| 1.5 | 3.0 | 135 | 118 | 104.6 |
| 1.5 | 2.0 | 143 | 126 | 105.9 |
| 1.5 | 1.0 | 154 | 135 | 107.1 |
| 3.0 | 8.0 | 97 | 74 | 91.3 |
| 3.0 | 5.0 | 113 | 100 | 100.0 |
| 3.0 | 3.0 | 128 | 118 | 103.9 |
| 3.0 | 2.0 | 138 | 126 | 105.5 |
| 3.0 | 1.0 | 151 | 135 | 106.9 |
| 4.5 | 6.5 | 97 | 87 | 96.3 |
| 4.5 | 5.0 | 106 | 100 | 100.0 |
| 4.5 | 3.0 | 122 | 118 | 103.8 |
| 4.5 | 2.0 | 133 | 126 | 105.5 |
| 4.5 | 1.0 | 147 | 135 | 106.9 |
| 6.0 | 5.0 | 101 | 100 | 100.0 |
| 6.0 | 3.0 | 117 | 118 | 103.8 |
| 6.0 | 2.0 | 129 | 126 | 105.4 |
| 6.0 | 1.0 | 144 | 135 | 106.9 |
| 7.5 | 5.0 | 100 | 100 | 100.0 |
| 7.5 | 3.0 | 117 | 118 | 103.8 |
| 7.5 | 2.0 | 128 | 126 | 105.4 |
| 7.5 | 1.0 | 144 | 135 | 106.9 |
| 9.0 | 5.0 | 100 | 100 | 100.0 |
| 9.0 | 3.0 | 117 | 118 | 103.8 |
| 9.0 | 2.0 | 128 | 126 | 105.4 |
| 9.0 | 1.0 | 144 | 135 | 106.9 |
| 10.5 | 5.0 | 100 | 100 | 99.9 |
| 10.5 | 3.0 | 117 | 118 | 103.8 |
| 10.5 | 2.0 | 128 | 126 | 105.4 |
| 10.5 | 1.0 | 144 | 135 | 106.9 |

ROTARY ELECTRIC MACHINE AND DRIVE SYSTEM USING SAME

TECHNICAL FIELD

The present invention relates to a rotary electric machine such as a squirrel-cage induction motor and a drive system using the same.

BACKGROUND ART

There has been known PTL1 as a related art regarding a width ws of a rotor slit located on an outer peripheral side of a rotor bar in a rotary electric machine. As illustrated in FIG. 20, FIG. 21, and a similar drawing in the literature, PTL1 is designed such that a slot leakage inductance (hereinafter also referred to as "leakage inductance") becomes an appropriate magnitude by configuring a slot width b (hereinafter also referred to as "width ws in a circumferential direction of the rotor slit") larger than a slot depth a (hereinafter also referred to as "height hs in a radial direction of the rotor slit").

CITATION LIST

Patent Literature

PTL 1: Japanese Unexamined Patent Application Publication (Translation of PCT Application) No. Hei 9-507376

SUMMARY OF INVENTION

Technical Problem

With the invention of PTL1, for example, as described in page 46 in the Literature that, "The slot leakage inductance, $L_{slot}$, which is one component of the rotor leakage inductance, is inversely proportional to the slot reluctance. With reference to the slot width b and slot depth a as illustrated in FIGS. 18 and 19, the slot leakage inductance is approximately given by the following expression: $L_{slot} \approx K_1 (\mu_0 aL)/b$ (17) where $K_1$ is a factor dependent upon the turns ratio, winding distribution, slot numbers, etc. Both the slot depth a and the width b can be changed—as illustrated in FIG. 20 which shows a wider width b and a shallower depth a—to increase the amount of spatial modulation which can be obtained as compared with adjustment of the width only," the slot leakage inductance is determined by the slot depth a (a height hs in a radial direction of the rotor slit) and the slot width b (the width ws of the rotor slit). However, since an influence from an increase in magnetic field intensity at a starting operation is not reflected to the design of the slot leakage inductance, the invention cannot improve a maximum torque and a rated power factor while reducing an increase in a starting current at the starting operation.

Solution to Problem

An object of the present invention is to provide a rotary electric machine that reduces an influence given to a leakage inductance by intensity of a magnetic field increasing at a starting operation to ensure improvement in a maximum torque and a rated power factor while reducing an increase in a starting current.

One example of a rotary electric machine of the present invention to solve the above-described problem is the rotary electric machine that includes a shaft, a rotor, and a stator. The rotor is fixed to an outer periphery of the shaft. The stator is located so as to surround an outer periphery of the rotor. The rotor includes a rotor iron core including a plurality of rotor slots located at predetermined intervals in a circumferential direction and rotor bars inserted into the rotor slots. Rotor slits communicate with outer peripheral sides of the rotor slots. The rotor slits have a width ws in a circumferential direction. The width ws is smaller than a height hs in a radial direction of the rotor slit, and when a rated current is denoted as I1, a turn ratio (primary/secondary) is denoted as Tr, and a magnetic permeability in a vacuum is denoted as $\mu_0$, a relationship of $ws > \mu_0 \times I1 \times Tr/0.6$ is met.

Advantageous Effects of Invention

A rotary electric machine of the present invention can improve a maximum torque and a rated power factor while reducing an increase in a starting current at a starting operation.

BRIEF DESCRIPTION OF DRAWINGS

FIG. 4 illustrates experimental results of the induction motor of Example 1.

DESCRIPTION OF EMBODIMENTS

Figure 1:
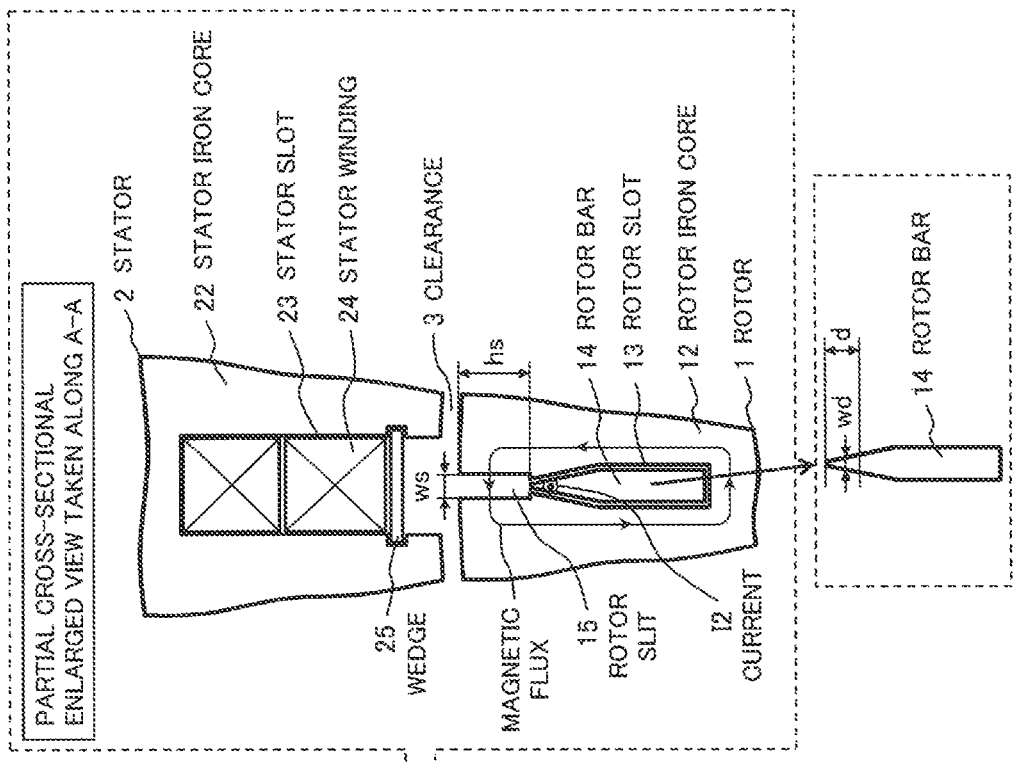
FIG. 1 includes partial cross-sectional views of an induction motor of Example 1.
Figure 1:
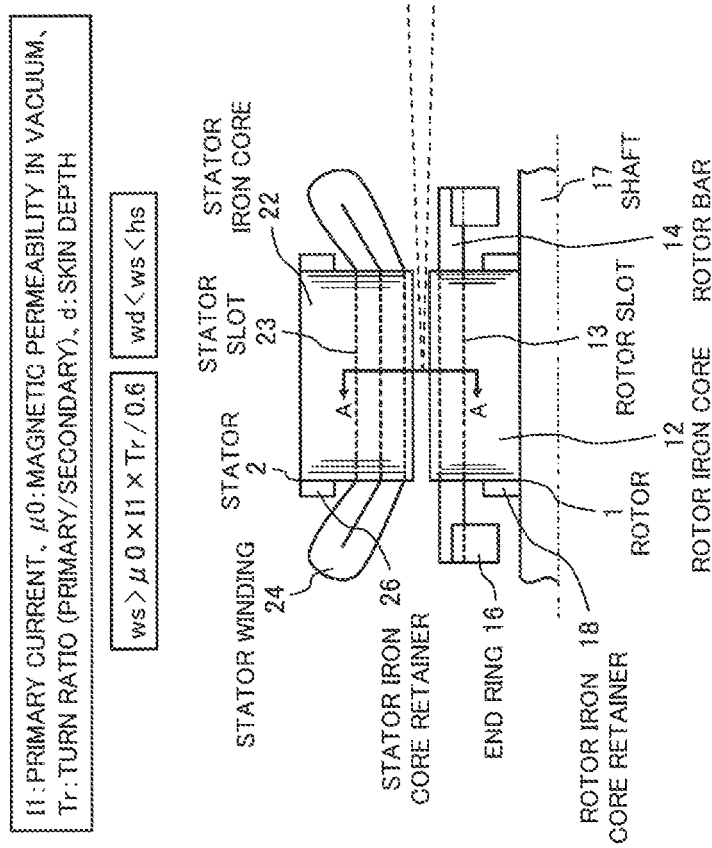

The following describes examples of a rotary electric machine of the present invention in detail with an example of a squirrel-cage induction motor with reference to the drawings. In the respective drawings describing the examples, identical names and reference numerals are assigned for identical components and the repeated description is omitted.

First Embodiment

FIG. 1 includes partial cross-sectional views of an induction motor of Example 1. In the left drawing of FIG. 1, reference sign 17 denotes a shaft serving as a rotation shaft. Reference sign 1 denotes a rotor fixed to an outer periphery of the shaft 17. Reference sign 2 denotes a stator located so as to surround the outer periphery of the rotor 1. Rotation of the rotor 1 using the shaft 17 as an axis causes the induction motor to function. The rotor 1 is constituted by a lamination of a plurality of rotor iron cores 12 each of which is made of an electromagnetic steel plate and the like. Circular rotor iron core retainers 18 retain both ends of the rotor iron cores 12 to integrate the rotor iron cores 12. The respective rotor iron cores 12 include a plurality of rotor slots 13 located at predetermined intervals in a circumferential direction. Both ends of rotor bars 14, which pass through the rotor slots 13, are fixed by circular end rings 16. Thus, the plurality of rotor bars 14 are fixed so as to be located parallel to the shaft 17. The stator 2 is constituted by a lamination of a plurality of stator iron cores 22 each of which is made of an electromagnetic steel plate and the like. Circular stator iron core retainers 26 retain both ends of the stator iron cores 22 to integrate the stator iron cores 22. The respective stator iron cores 22 include a plurality of stator slots 23 located at predetermined intervals in a circumferential direction. A stator winding 24 is inserted so as to pass through the stator slots 23. An energization to this stator winding 24 rotates the rotor 1 with the shaft 17 as the axis.

The right drawing of FIG. 1 is a partial cross-sectional enlarged view taken along A-A in the left drawing of FIG. 1 and illustrates cross-sectional shapes of the rotor 1 through which the rotor bar 14 is inserted, the stator 2 through which the stator winding 24 is inserted, a clearance 3 disposed between the two, and a similar component. As illustrated here, in the stator 2, the stator winding 24 is fixed to the stator slots 23 with a wedge 25. In the rotor 1, a rotor slit 15 is disposed on the outer peripheral side of the rotor slots 13 into which the rotor bars 14 are inserted. A width ws in the circumferential direction of this rotor slit 15 has been configured to be smaller than a height hs in a radial direction of the rotor slit 15. Furthermore, denoting a rated current flowing through the rotor bars 14 as I1, a turn ratio (primary/secondary) as Tr, and a magnetic permeability in a vacuum as $\mu_0$, the width ws of the rotor slit 15 was set so as to meet ws>$\mu_0$×I1×Tr/0.6 (Formula 6) described later). The following describes the reason that the width ws of the rotor slit 15 is set like (Formula 6) and effects brought by the setting in detail.

Denoting the width of the rotor slit 15 as ws, a magnetic field intensity of the rotor slit 15 as Hs, a magnetic path length of the rotor iron cores 12 near the rotor slit 15 as lc, a magnetic field intensity of the rotor iron cores 12 near the rotor slit 15 as Hc, and a current flowing through the rotor bars 14 as I2, considering an influence from magnetic saturation of the rotor iron cores 12 near the rotor slit 15 caused by a leakage flux, a relationship of the following formula is generally established by the Ampere's circuital law.

$$ws \times Hs + lc \times Hc = I2 \qquad \text{(Formula 1)}$$

Figure 2:
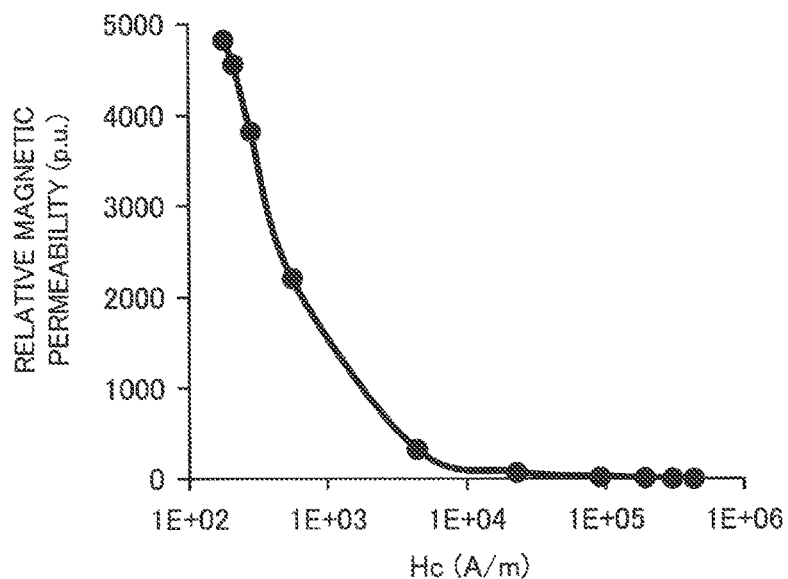
FIG. 2 is a graph illustrating a relative magnetic permeability of rotor iron cores of the induction motor of Example 1.

Here describes the relative magnetic permeability of the rotor iron cores 12 with reference to the semilogarithmic graph of FIG. 2. In FIG. 2, the horizontal axis indicates the magnetic field intensity Hc of the rotor iron cores 12, and the vertical axis indicates a relative magnetic permeability p.u. indicative of ease of passing of magnetic flux through the rotor iron cores 12. As illustrated here, the increase in the magnetic field intensity Hc of the rotor iron cores 12 decreases the relative magnetic permeability p.u. of the rotor iron cores 12. Therefore, as a result of an increase in a level of the magnetic saturation of the rotor iron cores 12 near the rotor slit 15, the magnetic flux illustrated in the right drawing of FIG. 1 becomes less likely to pass through, resulting in a small leakage inductance. Conversely, a decrease in the magnetic field intensity Hc increases the relative magnetic permeability p.u. Therefore, as a result of the decrease in the level of the magnetic saturation of the rotor iron cores 12 near the rotor slit 15, the magnetic flux illustrated in the right drawing of FIG. 1 becomes likely to pass through, resulting in a large leakage inductance.

Based on this point, focusing on the magnetic field intensity Hc of the rotor iron cores 12, which is the left side of (Formula 1), a current I2 flowing through the rotor bars 14 at a starting operation is larger than that at a rated operation. Accordingly, the magnetic field intensity Hc of the rotor iron cores 12 at the starting operation also becomes larger than that at the rated operation, and the relative magnetic permeability p.u. of the rotor iron cores 12 becomes small. The level of the magnetic saturation of the rotor iron cores 12 near the rotor slit 15 becoming large, resulting in the decrease in the leakage inductance. That is, it is seen that the current I2 has a relationship of almost inverse proportion to the leakage inductance.

It is seen from the above-described examination that, as long as the reduction in the leakage inductance can be reduced at the starting operation, that is, as long as the level of the magnetic saturation of the rotor iron cores 12 near the rotor slit 15 increasing at the starting operation can be decreased, an increase in a starting current Ish flowing through the rotor bars 14 at the starting operation can be reduced, thereby ensuring improvement in a maximum torque and a rated power factor at the starting operation.

Focusing on the magnetic field intensity Hs of the rotor slit 15, since the rotor slit 15 is a non-magnetic body, even when the magnetic field intensity Hs of the rotor slit 15 is large, the magnetic saturation does not occur in the rotor slit 15. Therefore, the increase in the magnetic field intensity Hs of the rotor slit 15 does not lower the leakage inductance.

Accordingly, by configuring the magnetic field intensity Hs of the rotor slit 15 to be sufficiently larger than the magnetic field intensity Hc of the rotor iron cores 12, the decrease in the leakage inductance at the starting operation is reduced and the increase in the starting current Ish is reduced. Thus, the leakage inductance at the rated operation can be lowered, and the maximum torque and the rated power factor can be improved.

The table of FIG. 4 shows experimental results of the starting current Ish, a maximum torque Tmax, and a rated power factor p.f. under respective conditions in which the width ws of the rotor slit 15 of FIG. 1 was changed in seven stages (1.5 to 10.5 mm) and a leakage permeance rate Ps at the rotor slit 15 with each width ws was changed in four or five stages. Here, the starting current Ish, the maximum torque Tmax, and rated power factor p.f. with the width ws of 7.5 mm and the leakage permeance rate Ps of 5 are defined as 100 points to indicate the experimental results by relative values.

Figure 3:
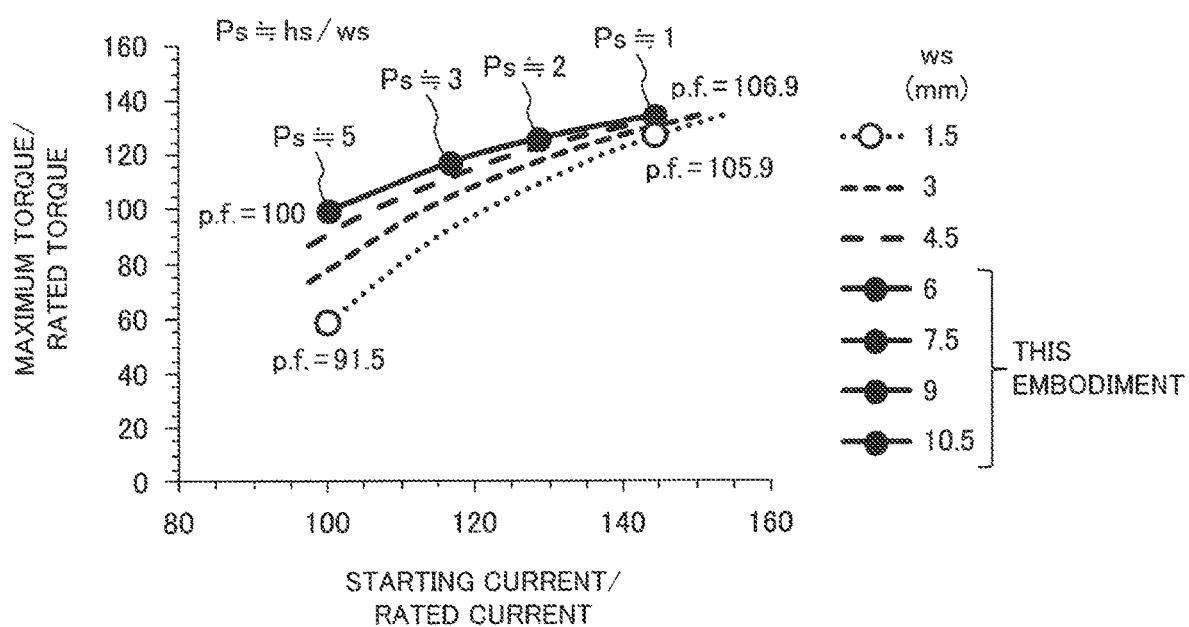
FIG. 3 illustrates experimental results of the induction motor of Example 1.

FIG. 3 is a graph based on the table of FIG. 4. The horizontal axis indicates the starting current Ish with respect to the rated current I1, the vertical axis indicates a maximum torque Tmax with respect to a rated torque TL, and the corresponding rated power factor p.f. is also described for some samples. Here also defines all of the three "maximum torque/rated torque," "starting current/rated current," and "rated power factor" with the width ws of the rotor slit 15 of 7.5 mm and the leakage permeance rate Ps of 5 as 100 points.

With the width ws of the rotor slit 15 of 1.5 mm (the dotted line), while changing the leakage permeance rate Ps from 1.0 to 10.0 allows decreasing the starting current/rated current, the maximum torque/rated torque and the rated power factor decrease substantially. Meanwhile, with the width ws of 6.0 mm (the solid line), changing the leakage permeance rate Ps from 1.0 to 5.0 allows decreasing the starting current/rated current and further reduces the decrease in the maximum torque/rated torque and the rated power factor. Since the induction motor desirably has properties of the small starting current/rated current and the large maximum torque/rated torque and rated power factor, it can be determined that the design with the wide width ws of 6 mm is more desirable from the comparisons of the two. As shown in FIG. 4, since the experimental results are approximately similar in the case where the width ws of 6.0 mm or more, FIG. 3 indicates the superimposed experimental results with the width ws of 6.0 to 10.5.

As described above, it is confirmed from FIG. 3 that increasing the width ws of the rotor slit 15 improves the maximum torque Tmax and the rated power factor p.f. while reducing the increase in the starting current Ish. Especially, like this example, the configuration of the width ws of 6 mm or more ensures maximally obtaining the effects to improve the maximum torque and the rated power factor while reducing the increase in the starting current Ish.

Figure 5:
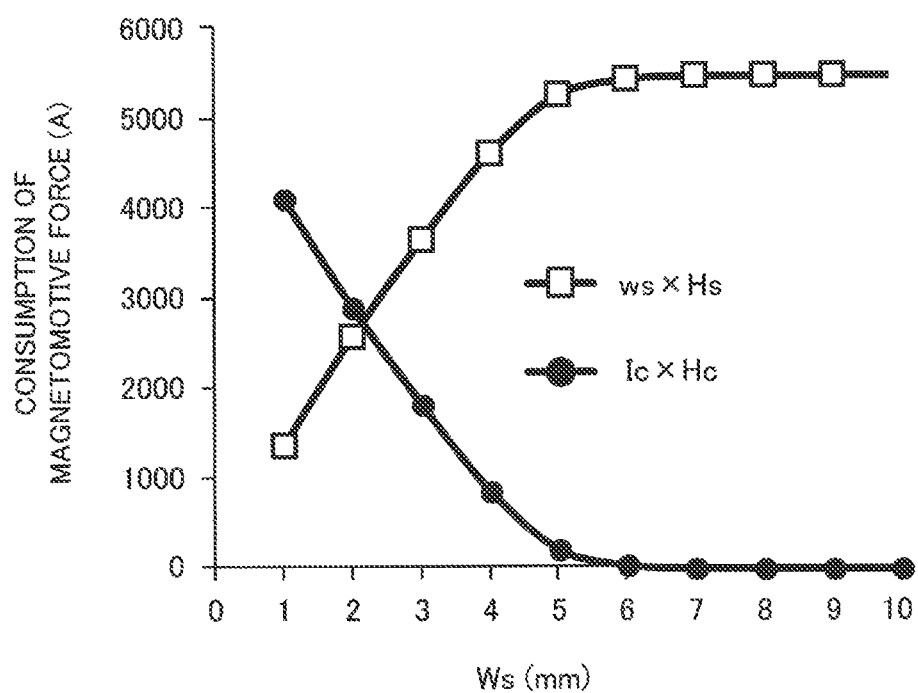
FIG. 5 illustrates consumption of a magnetomotive force at a starting operation of the induction motor of Example 1.

Next, the following describes consumption of a magnetomotive force of the induction motor of Example 1 at the starting operation with reference to FIG. 5. Generally, the consumption of the magnetomotive force is a product of the intensity of the magnetic field and a length of the magnetic path. Therefore, the consumption of the magnetomotive force at the rotor slit 15 is expressed by (the width ws of the rotor slit 15×the magnetic field intensity Hs of the rotor slit 15), the consumption at the magnetomotive force of the rotor iron cores 12 near the rotor slit 15 is expressed by (the magnetic path length lc of the rotor iron cores 12×the magnetic field intensity Hc of the rotor iron cores 12), and as indicated by (Formula 1), the sum of the two becomes the current I2 flowing through the rotor bars 14.

Here, as illustrated in FIG. 5, while increasing the width ws of the rotor slit 15 increases the consumption of the magnetomotive force (ws×Hs) at the rotor slit 15, the consumption of the magnetomotive force (lc×Hc) at the rotor iron cores 12 decreases. It is seen that, since a magnetic path length lc of the rotor iron cores 12 is approximately constant, increasing the width ws of the rotor slit 15 decreases the magnetic field intensity Hc of the rotor iron cores 12.

By increasing the width ws of the rotor slit 15 up to around 6 mm, the magnetic field intensity Hs of the rotor slit 15 becomes sufficiently large with respect to the magnetic field intensity Hc of the rotor iron cores 12. This ensures maximally obtaining the effects to improve the maximum torque and the rated power factor while reducing the increase in the starting current Ish, which become apparent from the comparison of the widths ws between 1.5 mm and 6.0 mm of FIG. 3.

Accordingly, with the width ws of the rotor slit 15 of 6 mm or more, the consumption of the magnetomotive force (lc×Hc) at the rotor iron cores 12 becomes extremely small; therefore, the second term in the left side of (Formula 1) is omitted and the formula is approximated as the following formula.

$$ws \times Hs \approx I2 \quad \text{(Formula 2)}$$

Denoting a magnetic-flux density of the rotor slit as Bs and a magnetic permeability in vacuum as $\mu_0$, the magnetic field intensity Hs of the rotor slit 15 is a quotient found by dividing Bs by $\mu_0$; therefore, (Formula 2) is expressed as the following formula.

$$ws \times Bs/\mu_0 \approx I2 \quad \text{(Formula 3)}$$

Accordingly, the magnetic-flux density Bs is expressed as the following formula from (Formula 3).

$$Bs \approx \mu_0 \times I2/ws \quad \text{(Formula 4)}$$

The width ws of the rotor slit 15 is expressed as the following formula from (Formula 4).

$$ws \approx \mu_0 \times I2/Bs \quad \text{(Formula 5)}$$

Denoting the rated current as I1 and a turn ratio (primary/secondary) as Tr, the current I2 used in the experiments of FIG. 4 becomes around 2×I1×Tr, 5500 A. At this time, the width ws of the rotor slit 15 with which the effects to improve the maximum torque and the rated power factor are maximally obtained while reducing the increase in the starting current Ish is 6 mm or more from the experimental results, and Bs at the time is obtained as around 1.2 T from (Formula 4).

Accordingly, the width ws of the rotor slit 15 with which the effects to improve the maximum torque and the rated power factor are maximally obtained while reducing the increase in the starting current Ish is the width ws when Bs in (Formula 5) becomes 1.2 T or less and expressed as the following formula.

$$ws > \mu_0 \times I2/1.2 = \mu_0 \times I1 \times Tr/0.6 \quad \text{(Formula 6)}$$

That is, by configuring the width ws of the rotor slit 15 so as to meet (Formula 6), the effects to improve the maximum torque and the rated power factor can be maximally obtained while reducing the increase in the starting current Ish.

While this example designs the width ws of the rotor slit 15 so as to have the constant size regardless of the position of the rotor slit 15 in the radial direction, the width ws does not have to have the constant size. In the case where the width ws does not have the constant size, when a minimum width wsn of the width ws meets (Formula 6), the effects to improve the maximum torque and the rated power factor are maximally obtained while reducing the increase in the starting current Ish.

When (Formula 6) is met, the leakage permeance rate Ps at the rotor slit 15 is approximated by Ps≈height hs/width ws of the rotor slit 15. As also illustrated in FIG. 3, according to the experimental results, the larger Ps increases the effects to improve the maximum torque and the rated power factor while reducing the increase in the starting current Ish by configuring the width ws of the rotor slit 15 to be large.

The comparison of the widths ws between 1.5 mm and 6.0 mm under conditions of, for example, Ps=1 and Ish=145 points results in the maximum torque of 135 points and the rated power factor of 106.9 with the width ws of 6.0 mm while the maximum torque of 125 points and the rated power factor of 105.9 points with the width ws of 1.5 mm. That is, under the condition of Ps=1, improvements are observed in the maximum torque by 10 points and in the rated power factor by 1.0 point by widening the width ws.

Meanwhile, the comparison of the widths ws between 1.5 mm and 6.0 mm under conditions of Ps=5 and Ish=100 points results in the maximum torque of 100 points and the rated power factor of 100 points with the width ws of 6.0 mm while the maximum torque of 60 points and the rated power factor of 91.5 points with the width ws of 1.5 mm. That is, it is seen that, under the condition of Ps=5, widening the width ws brings remarkable improvements, 40 points in the maximum torque and 8.5 points in the rated power factor; therefore, the larger Ps brings the larger effects.

In contrast to this, with Ps smaller than 1, the improvements are small, less than 10 points in the maximum torque and less than 1.0 point in the rated power factor, and therefore, the improving effects obtained by increasing the width ws of the rotor slit 15 are small. Therefore, with this example, by increasing Ps to be larger than 1 (configuring the width ws of the rotor slit 15 to be smaller than the height hs), the effects to improve the maximum torque and the rated power factor are sufficiently obtained while reducing the increase in the starting current Ish.

While this example designs the width ws of the rotor slit 15 so as to have the constant size regardless of the position of the rotor slit 15 in the radial direction, the width ws does not have to have the constant size. In the case where the width ws does not have the constant size, when a maximum width of the width ws is configured to be smaller than the height hs of the rotor slit 15, Ps becomes at least larger than 1 and the effects to improve the maximum torque and the rated power factor are sufficiently obtained while reducing the increase in the starting current Ish.

Denoting a skin depth of the current flowing through the rotor bars 14 at the starting operation as d and an average width of the rotor bars 14 up to the skin depth of the current flowing through the rotor bars 14 at the starting operation as wd, the leakage permeance rate Ps of the rotor slots 13 at the starting operation is d/(3×wd) at most, and becomes around 0.85 at most in this example. In this example, Ps is configured to be 1 or more, which is larger than 0.85. This ensures sufficiently obtaining the effects to improve the maximum torque and the rated power factor while reducing the increase in the starting current Ish.

In this example, the width ws of the rotor slit 15>the average width wd of the rotor bars 14 is established. This is because, when this inequality is met while a starting current Ish is small and while the torque at the starting operation, namely, the starting torque is large, the effects to improve the maximum torque and the rated power factor can be maximally obtained while reducing the increase in the starting current Ish. The following describes the reason that this inequality is derived in detail.

First, denoting a secondary resistance as R2, a power frequency as f, and a rated slip as s, the rated torque TL is approximated as the following formula.

$$TL \approx 3 \times I1^2 + R2/(2\pi f s) \quad \text{(Formula 7)}$$

Denoting a deep groove effect coefficient of the secondary resistance at the starting operation as Kr, a starting torque Tst is approximated as the following formula.

$$Tst \approx 3 \times Ish^2 + Kr \times R2/(2\pi f) \quad \text{(Formula 8)}$$

Therefore, Kr is expressed by the following formula using a quotient found by dividing (Formula 8) by (Formula 7).

$$Kr \approx (Tst/TL)/(s \times (Ish/I1)^2) \quad \text{(Formula 9)}$$

Replacing Tst and Ish with a ratio of TL to I1 to make it dimensionless (Formula 9) as the following formula.

$$Kr \approx Tst/(s \times Ish^2) \quad \text{(Formula 10)}$$

Generally, specifications of the induction motor are configured such that the starting torque Tst becomes the minimum value and the starting current Ish becomes the maximum value; therefore, Kr that can satisfy both specifications of Tst and Ish is expressed as the following formula from (Formula 10).

$$Kr > Tst/(s \times Ish^2) \quad \text{(Formula 11)}$$

Here, denoting a cross-sectional area of the rotor bars 14 as Sb, Kr is approximated as the following formula.

$$Kr \approx Sb/(d \times wd) \quad \text{(Formula 12)}$$

Denoting a resistivity of the rotor bars 14 as ρ, d is approximated as the following formula.

$$d \approx (\rho/(\sigma \times \mu_0 \times f))^{0.5} \quad \text{(Formula 13)}$$

wd that can satisfy both specifications of the starting torque Tst and the starting current Ish is expressed as the following formula from (Formula 11) and (Formula 12).

$$wd < Sb \times s \times Ish^2/(Tst \times d) \quad \text{(Formula 14)}$$

Accordingly, in the case where the starting current Ish is small and in the case where the starting torque Tst is large, that is, in the case where the specifications of Ish and Tst are severe, wd satisfying both specifications of Tst and Ish becomes small.

When the width ws of the rotor slit 15 with which the effects to improve the maximum torque and the rated power factor are maximally obtained while reducing the increase in the starting current Ish becomes larger than wd satisfying both specifications of Tst and Ish, the relationship as the following formula is established from (Formula 6) and (Formula 14).

$$K < 2 \times 10^{-3.5}/1.2 = 0.00053 \quad \text{(Formula 15)}$$

$$K = (f/\rho)^{0.5} \times Sb \times s \times Ish/(I1 \times Tr \times Tst) \quad \text{(Formula 16)}$$

That is, with a squirrel-cage induction motor establishing the relationship of (Formula 15) where the starting current Ish is small and the starting torque is large, the width ws of the rotor slit 15 with which the effects to improve the maximum torque and the rated power factor are maximally obtained while reducing the increase in the starting current Ish becomes larger than wd satisfying both specifications of Tst and Ish.

In this example, f is 60 Hz, ρ is 7.5×10⁻⁸ Ω·m, s is 0.7%, I1×Tr/Sb is 4 A/mm², and Ish/Tst is 7.5, and K becomes 0.00037 from (Formula 16), thereby establishing the relationship of (Formula 15).

Accordingly, this example has the relationship of ws>wd so as to maximally obtain the effects to increase the maximum torque and the rated power factor while reducing the increase in the starting current Ish.

While this example designs the width ws of the rotor slit 15 so as to have the constant size regardless of the position of the rotor slit 15 in the radial direction, the size of the width ws may be changed at the position in the radial direction. When the width ws does not have the constant size, configuring the minimum width wsn of the width ws larger than wd (wsn>wd) allows maximally obtaining the effects to increase the maximum torque and the rated power factor while reducing the increase in the starting current Ish.

When the size of width ws of the rotor slit 15 is changed at the position in the radial direction, the width ws may be the minimum width at the outer peripheral side of the rotor slit 15. Decreasing the width at the outer peripheral side of the rotor slit 15 lowers harmonic components of an iron loss generated near the inner peripheral surfaces of the stator iron cores 22. This improves efficiency at the rated operation and lowers the current at no-load operation, improving the power factor at the rated operation.

Second Embodiment

Figure 6:
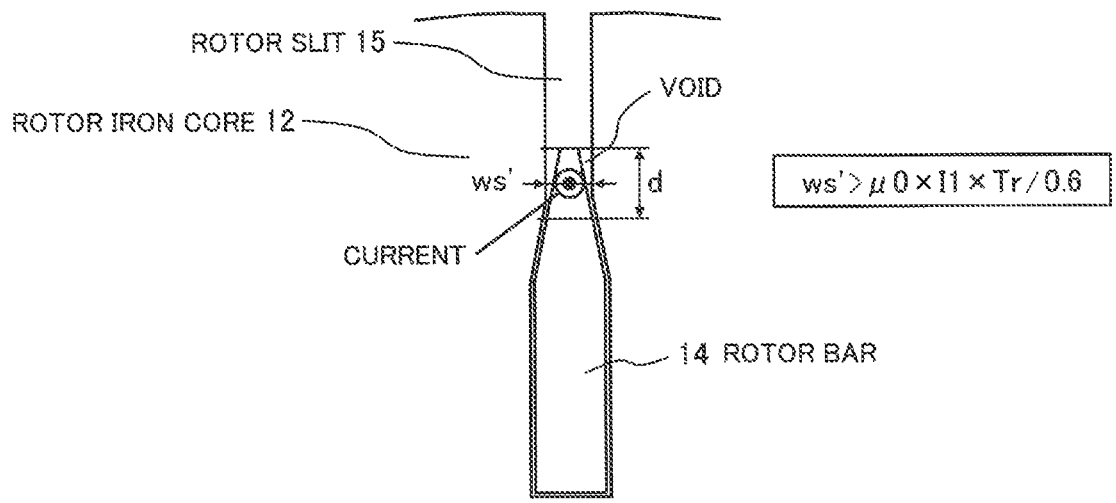
FIG. 6 is a partial cross-sectional view of an induction motor of Example 2.

FIG. 6 is a partial cross-sectional view of an induction motor of Example 2. The following omits descriptions of points common to the above-described example.

In this example, denoting an average width of the rotor slots 13 up to the skin depth d of the current flowing through the rotor bars 14 at the staring operation as ws', the relationship of the following formula is met.

$$ws' > \mu_0 \times l2/1.2 = \mu_0 \times l1 \times Tr/0.6 \qquad \text{(Formula 17)}$$

This example increases the average width ws' at the outer peripheral side of the rotor slots 13 in addition to the width ws of the rotor slit 15 to ensure reducing the low leakage inductance occurred at the staring operation. Accordingly, establishing (Formula 17) ensures obtaining the effects to improve the maximum torque and the rated power factor while reducing the increase in the starting current Ish.

Additionally, in this example, a difference between the average width ws' of the rotor slots 13 and the average width wd of the rotor bars 14 increases; therefore, a void between surfaces in the circumferential direction of the rotor bars 14 and the rotor iron cores 12 becomes large. Accordingly, cooling air also blows to the surfaces in the circumferential direction of the rotor bars 14, ensuring an effect of improvement in cooling performance as well.

Third Embodiment

Figure 7:
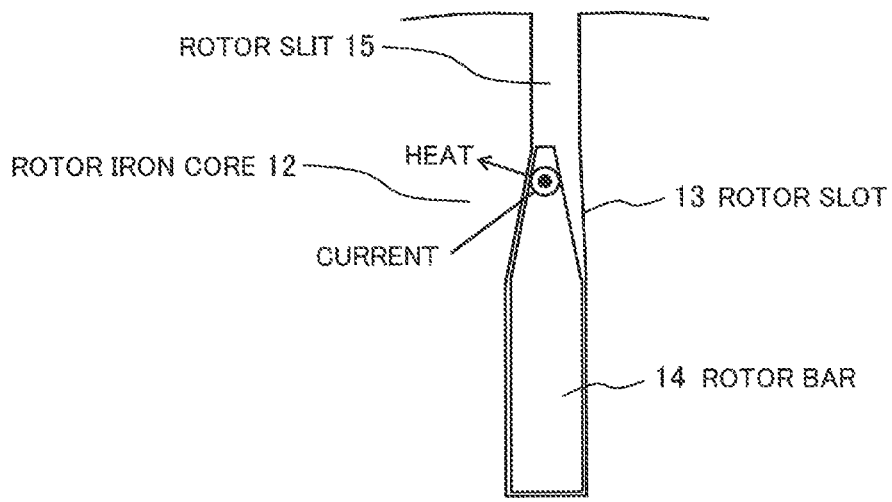
FIG. 7 is a partial cross-sectional view of an induction motor of Example 3.

FIG. 7 is a partial cross-sectional view of an induction motor of Example 3. The following omits descriptions of points common to the above-described examples.

This example forms the rotor slots 13 into an asymmetrical shape in the circumferential direction and brings only one surface in the circumferential direction of a part of the rotor bars 14 up to the skin depth of the current flowing through the rotor bars 14 at the starting operation into contact with the rotor iron cores 12 in Example 2.

The current concentrates on the rotor bars 14 up to the skin depth at the starting operation and a loss concentrates on the identical parts. Accordingly, bringing the rotor bars 14 up to the skin depth into contact with the rotor iron cores 12 allows transmission of heat generated in the rotor bars 14 to the rotor iron cores 12, thereby ensuring lowering a temperature rise at the rotor bars 14.

In addition to this, bringing the rotor bars 14 into contact with the rotor iron cores 12 by only one surface allows satisfying the relationship of (Formula 17), thereby ensuring the effects to improve the maximum torque and the rated power factor while reducing the increase in the starting current Ish as well.

Fourth Embodiment

Figure 8:
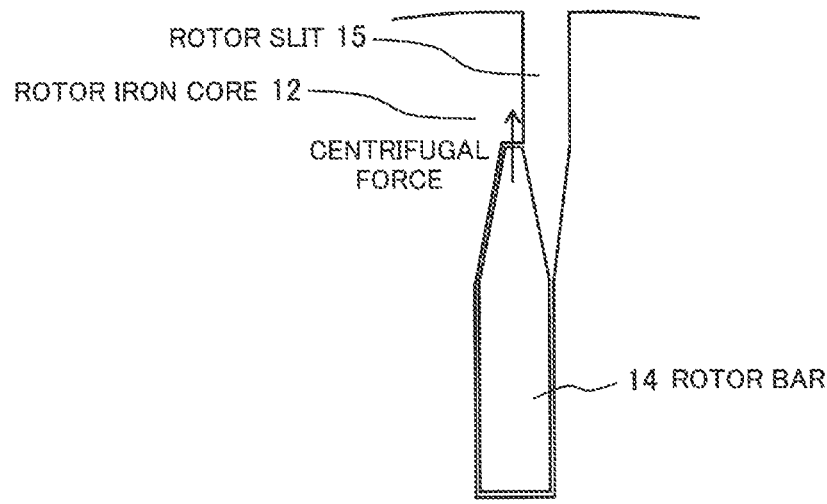
FIG. 8 is a partial cross-sectional view of an induction motor of Example 4.

FIG. 8 is a partial cross-sectional view of an induction motor of Example 4. The following omits descriptions of points common to the above-described examples.

This example brings the outer peripheral surfaces of the rotor bars 14 into contact with the rotor iron cores 12 in Example 3. By this configuration, when a centrifugal force occurs in the rotor bars 14 toward the outer peripheral side by the rotation of the rotor 1, the outer peripheral surfaces of the rotor bars 14 are brought into contact with the rotor iron cores 12 to ensure further strongly supporting the rotor bars 14 by the rotor iron cores 12.

Fifth Embodiment

Figure 9:
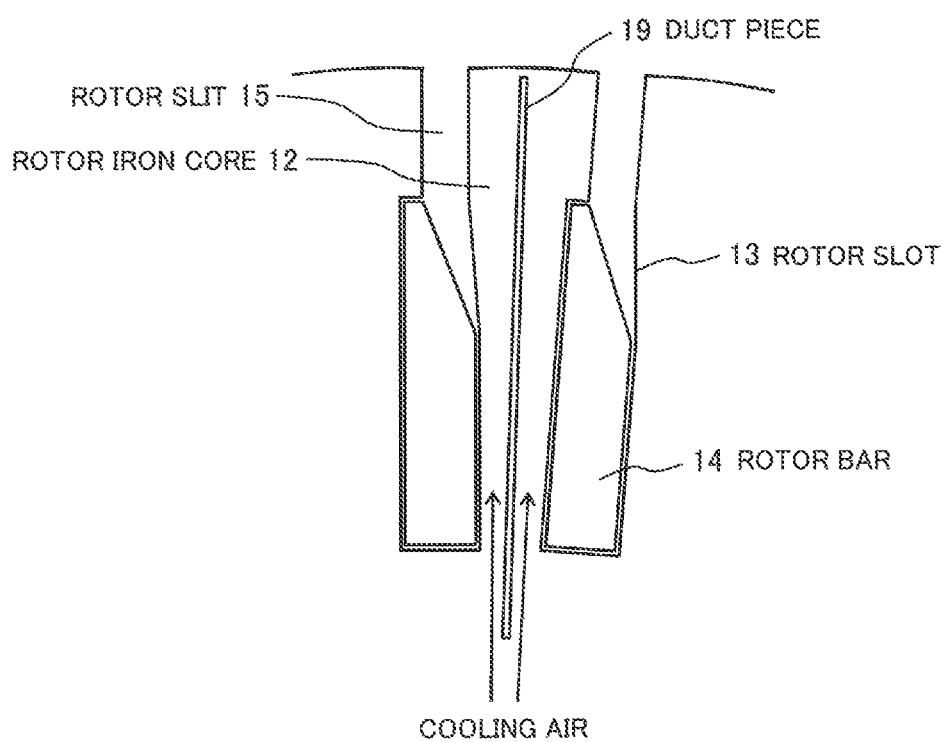
FIG. 9 is a partial cross-sectional view of an induction motor of Example 5.

FIG. 9 is a partial cross-sectional view of an induction motor of Example 5. The following omits descriptions of points common to the above-described examples.

This example forms the rotor bars 14 into an asymmetrical shape in a circumferential direction and forms the rotor slots 13 into an approximately symmetrical shape in the circumferential direction in Example 4. Since this rotor slots 13 meet (Formula 17) of Example 2, the end portions on the outer peripheral side have a slightly inclined shape. That is, the right side surfaces of the rotor slits 15 and the right side surfaces of the rotor slots 13 of FIG. 9 do not constitute the identical plane, having a positional relationship of inclination by a predetermined degree.

In the case where radial ducts are disposed at the squirrel-cage induction motor, duct pieces 19 are radially located toward the radial direction. Like this example, forming the rotor slots 13 into a shape almost symmetrical in the circumferential direction allows the duct pieces 19 to be located near the center in the circumferential direction of rotor iron cores 12, facilitating a joining of the duct pieces 19 with the rotor iron cores 12.

Sixth Embodiment

Figure 10:
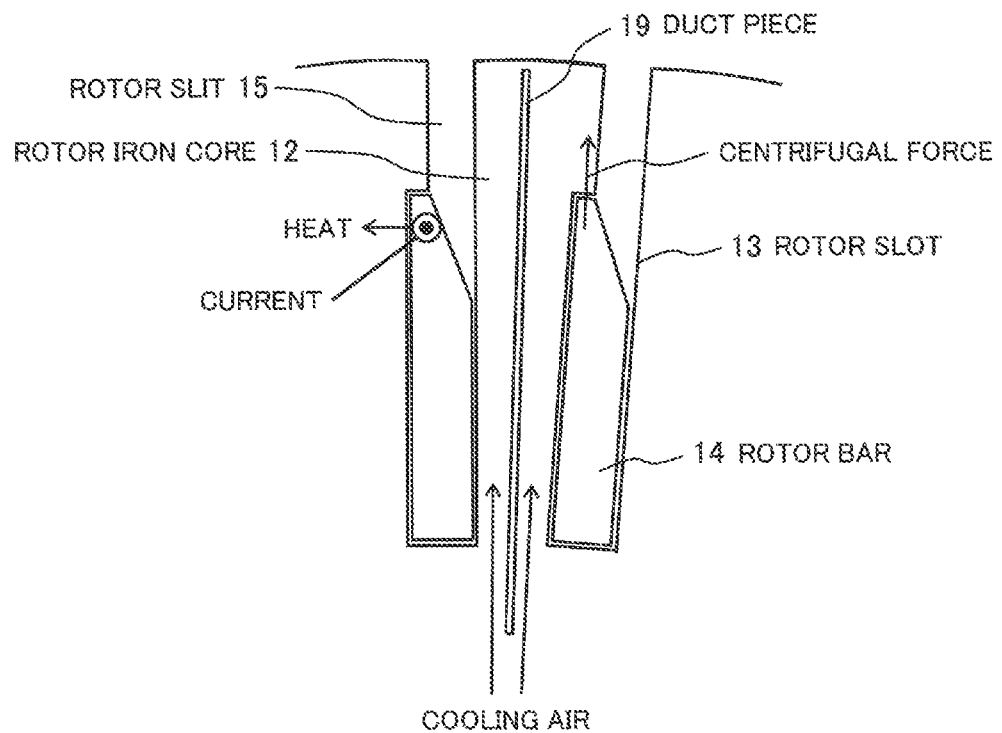
FIG. 10 is a partial cross-sectional view of an induction motor of Example 6.

FIG. 10 is a partial cross-sectional view of an induction motor of Example 6. The following omits descriptions of points common to the above-described examples.

This example forms the rotor bars 14 into an asymmetrical shape in the circumferential direction, brings only one surface in the circumferential direction of a part of the rotor bars 14 up to the skin depth of the current flowing through the rotor bars 14 at the starting operation into contact with the rotor iron cores 12, and brings the outer peripheral surfaces of the rotor bars 14 into contact with the rotor iron cores 12. While Example 5 forms the rotor slots 13 into the approximately symmetrical (partially asymmetrical) shape, this example forms the rotor slots 13 into a symmetrical shape for further easy production.

With the induction motor of this example, the current concentrates on the rotor bars 14 up to the skin depth at the starting operation and a loss concentrates on the identical part. Accordingly, bringing the rotor bars 14 up to the skin depth into contact with the rotor iron cores 12 allows transmission of heat generated in the rotor bars 14 to the rotor iron cores 12, thereby ensuring lowering a temperature rise at the rotor bars 14.

Additionally, bringing the rotor bars 14 into contact with the rotor iron cores 12 by only one surface allows satisfying the relationship of (Formula 17), thereby ensuring the effects to improve the maximum torque and the rated power factor while reducing the increase in the starting current Ish as well.

The rotation of the rotor 1 causes the rotor bars 14 to generate the centrifugal force toward the outer peripheral side. Accordingly, bringing the outer peripheral surfaces of the rotor bars 14 into contact with the rotor iron cores 12 ensures further strongly supporting the rotor bars 14 by the rotor iron cores 12.

In the case where radial ducts are disposed at the squirrel-cage induction motor, the duct pieces 19 are radially located toward the radial direction.

Since the rotor slots 13 have the shape symmetrical in the circumferential direction, the duct pieces 19 can be located near the center in the circumferential direction of the rotor iron cores 12, facilitating the joining of the duct pieces 19 with the rotor iron cores 12.

Seventh Embodiment

Figure 11:
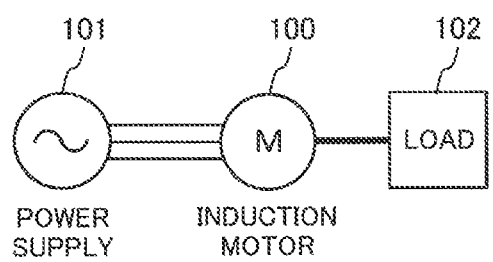
FIG. 11 is a block diagram of an induction motor system of Example 7.

FIG. 11 is a block diagram of an induction motor system of Example 7. The following omits descriptions of points common to the above-described examples.

This example is a drive system that includes an induction motor 100, which is described in any one example of the first to Example 6s, and a load 102 driven by the induction motor 100. In the drive system, the induction motor 100 is started by a power supply 101 by full voltage starting.

Since the drive system is the drive system using the induction motor 100 described in any one example of the first to Example 6s, the effects to improve the maximum torque and the rated power factor are obtained while reducing the increase in the starting current Ish.

REFERENCE SIGNS LIST 1 rotor
2 stator
3 clearance
12 rotor iron core
13 rotor slot
14 rotor bar
15 rotor slit
16 end ring
17 shaft
18 rotor iron core retainer
19 duct piece
22 stator iron core
23 stator slot
24 stator winding
25 wedge
26 stator iron core retainer
100 induction motor
101 power supply
102 load
Hc magnetic field intensity of the rotor iron core near the rotor slit
Hs magnetic field intensity of the rotor slit
I1 rated current flowing through the rotor bar
I2 current flowing through the rotor bar
Ish starting current flowing through the rotor bar
Ps leakage permeance rate of the rotor slit
Tr turn ratio
TL rated torque
Tst starting torque
Tmax maximum torque
lc magnetic path length of the rotor iron core near the rotor slit
hs height in a radial direction of the rotor slit
ws width in a circumferential direction of the rotor slit
wd average width of the rotor bars

The invention claimed is:

1. A rotary electric machine comprising:
a shaft;
a rotor fixed to an outer periphery of the shaft; and
a stator located so as to surround an outer periphery of the rotor,
wherein the rotor includes:
  a rotor iron core that includes a plurality of rotor slots located at predetermined intervals in a circumferential direction; and
  rotor bars inserted into the rotor slots,
wherein rotor slits communicate with outer peripheral sides of the rotor slots, the rotor slits having a width ws in a circumferential direction,
the width ws is smaller than a height hs in a radial direction of the rotor slit; and
when a rated current is denoted as I1, a turn ratio (primary/secondary) is denoted as Tr, and a magnetic permeability in a vacuum is denoted as $\mu_0$,
a relationship of $ws > \mu_0 \times I1 \times Tr/0.6$ is met.

2. The rotary electric machine according to claim 1,
wherein the rotor slit has a maximum width of the width ws in the circumferential direction smaller than the height hs in the radial direction of the rotor slit, and
the rotor slit has a minimum width wsn of the width ws in the circumferential direction having a relationship of meeting:

$wsn > \mu_0 I1 \times Tr/0.6$.

3. The rotary electric machine according to claim 2,
wherein when a power frequency is denoted as f, a resistivity of the rotor bar is denoted as $\rho$, a cross-sectional area of the rotor bar is denoted as Sb, a slip is denoted as s, a starting current is denoted as Ish, and a starting torque is denoted as Tst, a relationship of:

$(f/\rho)^{0.5} \times Sb \times s \times Ish/(I1 \times Tr \times Tst) < 0.00053$ is met, and the rotor bar has an average width wd up to a skin depth of a current flowing through the rotor bar at a staring operation meets a relationship of:

$ws > wd$.

4. The rotary electric machine according to claim 3,
wherein a relationship of $wsn > wd$ is met.

5. The rotary electric machine according to claim 4,
wherein when an average width of the rotor slots up to the skin depth of the current flowing through the rotor bar at the staring operation is denoted as ws', a relationship of:

$ws' > \mu_0 \times I1 \times Tr/0.6$ is met.

6. The rotary electric machine according to claim 1,
wherein the rotor slot has a cross-sectional shape of an asymmetrical shape in the circumferential direction, and
the rotor bar contacts the rotor iron core by only one surface in the circumferential direction on an outer peripheral side of the rotor bar and up to a skin depth where a starting current flows at a staring operation.

7. The rotary electric machine according to claim 1,
wherein the rotor bar has a cross-sectional shape of an asymmetrical shape in the circumferential direction, and
the rotor bar contacts the rotor iron core by only one surface in the circumferential direction on an outer peripheral side of the rotor bar and up to a skin depth where a starting current flows at a staring operation.

8. The rotary electric machine according to claim 7,
wherein the rotor slots are formed into a shape approximately symmetrical in the circumferential direction.

9. The rotary electric machine according to claim 6,
wherein the rotor bar has an outer peripheral surface brought in contact with the rotor iron core.

10. A drive system comprising:
the rotary electric machine according to claim 1;
a load driven by the rotary electric machine; and
a power supply configured to supply the rotary electric machine with an electric power, wherein
the rotary electric machine is started by the power supply by full voltage starting.

* * * * *